United States Patent [19]

Cihak et al.

[11] Patent Number: 5,710,688
[45] Date of Patent: Jan. 20, 1998

[54] FLOPPY DRIVE SEAL INSERT

[76] Inventors: Charles P. Cihak, 435 Beaumont Blvd.; Om P. Lal, 520 San Pablo Ter., both of Pacifica, Calif. 94044

[21] Appl. No.: 779,210

[22] Filed: Jan. 6, 1997

Related U.S. Application Data

[63] Continuation-in-part of Ser. No. 583,336, Jan. 5, 1996, abandoned, which is a continuation-in-part of Ser. No. 385,562, Feb. 8, 1995, abandoned.

[51] Int. Cl.$^6$ .................................................. G11B 23/02
[52] U.S. Cl. .................................................. 360/137
[58] Field of Search ........................ 360/97.02, 97.04, 360/137

[56] References Cited

U.S. PATENT DOCUMENTS

| | | | |
|---|---|---|---|
| 4,633,349 | 12/1986 | Beck | 360/97 |
| 4,980,785 | 12/1990 | Talmadge | 360/97.02 |
| 5,030,260 | 7/1991 | Beck | 55/316 |
| 5,101,305 | 3/1992 | Ohkita | 360/97.02 |
| 5,122,918 | 6/1992 | Chao | 360/133 |

*Primary Examiner*—David W. Wu
*Attorney, Agent, or Firm*—Allston L. Jones

[57] ABSTRACT

A seal device that when inserted, impedes entrance of airborne contaminants drawn into a floppy disk drive while not in operation. Accomplished by having a body of sufficiently rigid sheet material to provide support and structure for a strip of seal material. Size of the body is configured to fit into a floppy disk drive and incorporates external stops to prevent the over insertion of the inwardly extending card portion to prevent damage to parts internal to the floppy disk drive. Thus the configuration of the body portion is such so as to not engage sensitive floppy drive internal mechanisms or require modification of the hardware of the floppy drive. The included seal strip is of sufficiently elastic solid or porous material capable of impeding airborne contaminants when bedded in a floppy disk drive port orifice with that strip being of sufficient size to encircle the card portion and to fill the mouth of the floppy disk drive.

6 Claims, 5 Drawing Sheets

FLOPPY DRIVE SEAL INSERT

This application is a Continuation-In Part of patent application Ser. No. 08/583,336 entitled "FLOPPY DRIVE SEAL INSERT" filed Jan. 5, 1996, now abandoned in the names of Charles P. Cihak and Om P. Lal, which was a Continuation-in-Part of patent application Ser. No. 08/385,562 filed Feb. 8, 1995 now abandoned.

FIELD OF THE INVENTION

The present invention relates to the environmental control of floppy disk drives, more specifically to an insert that is user insertable seal into the mouth of floppy disk drives.

BACKGROUND OF THE INVENTION

Floppy disk drives are found in various devices such as, but not limited to, desk-top and other computers. The floppy disk drive is a device that performs specific data retrieval and recording functions via a removable media such as a floppy disk. A floppy disk drive has a port, an externally accessible orifice, into which a floppy disk is extended.

In a computer and other devices, there is an internal fan to move air for cooling purposes throughout the housing of the computer, including the floppy disk drives. There are air vents in the housing through which external air is drawn in to aid in that cooling. A housing's design is such that the interior of the computer is a plenum with the plenum design allowing air to flow freely throughout without regard to where the air is drawn from, with the nature of air being such that it will follow the path of least resistance.

Since a floppy disk drive is an unsealed unit with an externally exposed port (that through which a floppy disk can be inserted) through which air can flow, over time, this exposure to air flow is harmful to the internal parts of the floppy disk drive and the operation of those parts.

Since the air around us contains suspended abrasives and other contaminants, these contaminants settle and attach themselves to static items with which they make contact. Over time a build up of these contaminants can occur with such build-up becoming destructive, inhibiting the operation of the floppy disk drive.

Unlike a floppy disk drive which is an externally accessible disk player, there is also another disk player commonly called a hard disk drive in most computers. A hard disk drive is a sealed instrument with self-contained disks for data retrieval and storage, thus there are no externally accessible ports; communication is solely electronic via wires or a sealed electrical connector. A hard disk drive is a highly sensitive instrument and extreme care is required in the manufacturing and operation of a hard disk drive to protect it from airborne contaminants and other factors that can be injurious to the operation of a hard disk drive, e.g., vibration.

Three U.S. Pat. Nos. 5,101,305 to Ohkita (1992), 5,030,260 to Beck (1991), and 4,633,349 to Beck (1986)—relate specifically to hard disk drive environmental control, which is designed to protect the hard disk drive mechanism from airborne contaminants. Due to the construction differences between a hard disk drive and a floppy disk drive, those techniques do not extend to floppy disk drives.

During the typical operation of a computer, a hard disk drive performs most data storage and retrieval. In contrast, an floppy disk drive is idle and it's port is vacant of any media unless a specific disk operation is requested by the operator. This static condition allows harmful amounts of airborne contaminants to accumulate within a floppy disk drive. Typically, a person using a floppy disk drive would be unaware that a problem has occurred from excessive build up of contamination until an floppy disk drive failure occurs.

The current art in this area of floppy disk drives is illustrated by two U.S. Patents, namely U.S. Pat. Nos. 4,980,785 and 5,122,918. In U.S. Pat. No. 4,980,785, issued Dec. 25, 1990, to Talmadge, there is shown a disk drive slot dust protector that is molded of a single piece of resilient plastic with one edge being wedge shaped and the full width of a standard disk slot and the edge extending away from the wedge shaped edge has a finger tab to facilitate insertion and removal of that dust protector to and from the disk slot. The wedge is shaped to only extend a limited distance into the disk slot without interacting with any portion of the internal mechanism of the floppy disk drive. Unfortunately, despite the fact that the Talmadge patent illustrates the disk slot in a floppy disk drive as having a uniform height throughout the entire width of that slot, most floppy disk drives do not have such a slot. Most floppy disk drives have a slot that is wider, or taller, in the center to permit the user to grasp a floppy disk for insertion and removal. Additionally, the slots of 3.5 inch floppy disk drives also generally have a spring-loaded door (n.b., those doors do not make air tight seals when closed) that closes when no disk has been inserted into the floppy disk drive. Both the non-uniform height and the spring loaded door prevent the wedge shaped dust protector of Talmadge from making a good dust seal at the mouth of floppy disk drives.

In U.S. Pat. No. 5,122,918, issued Jun. 16, 1992, to Chao there is shown another design of a dust protective device for floppy disk drives. Illustrated here is a card that is rectangular in shape that is substantially the full width of the mouth of the disk drive and is long enough so that when it is inserted extends between the read/write heads of the drive at the far end. Around the edge of the card that is not to be inserted into the drive, there is a foam air filtering element that fully encircles that edge with an optional finger tab extending away from that edge to facilitate the insertion and withdrawal to/from the mouth of the floppy disk drive. A filter of this design could actually cause physical damage to the internal parts of the floppy disk drive with the forward edge extending to the read/write heads and there not being any stop of the filter edge to prevent total insertion of the device into the floppy disk drive.

SUMMARY OF THE INVENTION

The present invention is an insertable sealing device for insertion into a disk drive when not in operation through a slot in the disk drive through which removable media is inserted and removed from the disk drive. Such a sealing device when in place in the slot impedes entrance of airborne contaminants into the disk drive through the slot. The construction of the sealing device of the present invention includes a T-shaped body portion of a rigid sheet material shaped to mate with a selected disk drive design. The T-shaped body portion defines two regions:

- a first region that is narrower and thinner than the width and height, respectively, of the slot of the disk drive and that is disposed to be inserted into the disk drive through the slot with the first region being the stem of the T and being shorter than the distance from the slot to the rear of the disk drive; and
- a second region that is wider than the width of the slot of the disk drive and that is not disposed to be accepted by the disk drive, with the second region being the crossbar of the T-shape with the edge thereof extending away from the intersection of the first and second regions forming a stop surface to limit the distance that the first region can be inserted through the slot into the disk drive.

Additionally, there is a ring of sealing material surrounding the first region of the body that is spaced apart a selected distance from the stop surface of the second region to position the ring of sealing material in the slot of the disk drive to seal the slot when the stop surface contacts the disk drive. The sealing material is also elastic and in ample quantity to fill the slot of the disk drive.

Variations of the basic design include the folding downward of the portions of the second region that extend beyond the width of the first region to form tabs with the edge of the tabs extending away from the intersection of the first and second regions forming a stop surface to limit the distance that the first region can be inserted into the slot of the disk drive.

Another variation is the folding downward of a selected length of the portions of the cross-bar of the second region that extend beyond the width of the first region to form tabs with the edge of the tabs together with the remaining portion of the cross-bar that extends away from the intersection of the first and second regions forming a three dimension stop surface to limit the distance that the first region can be inserted into the slot of the disk drive.

Yet another variation is the limiting of the length of the first region to be substantially shorter than the length of a disk to be accepted by the disk drive to prevent the extension of the first region to delicate parts within the disk drive when the sealing device is inserted into the disk drive.

DETAILED DESCRIPTION OF THE PRESENT INVENTION

Figure 1:
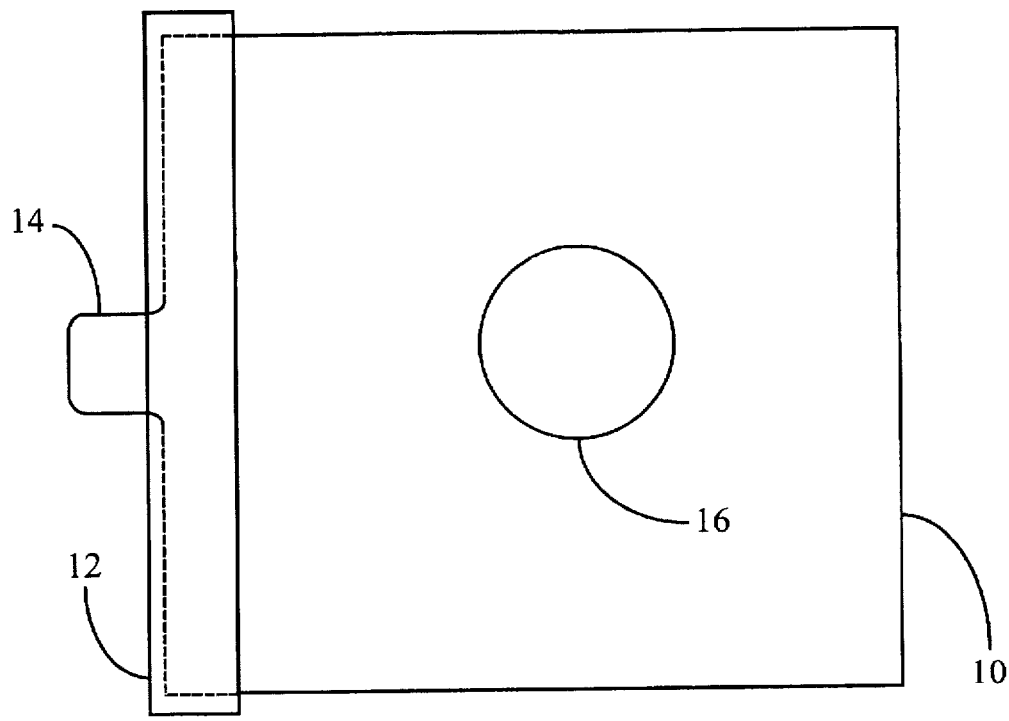
FIG. 1 is a top view of the prior art Chao rectangular floppy drive filter-seal insert.
Figure 2:
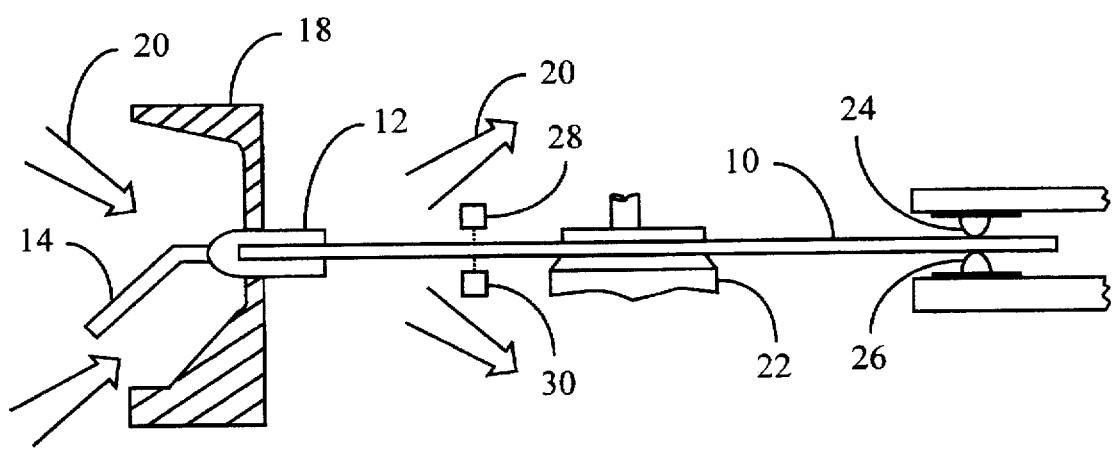
FIG. 2 is a partial cut-away side view of the prior art Chao rectangular floppy drive filter-seal insert placed within a floppy disk drive.

FIGS. 1 and 2 illustrate the prior art floppy drive filter-seal disclosed by Chao. In FIG. 1 a top view of the unit is shown having a rectangular card 10 with a foam filter cap 12 on edge with an optional finger grasping tap 14 centrally located and extending through filter cap 12.

Then in FIG. 2 the floppy drive filter-seal of Chao is shown inserted into a floppy disk drive. As can be seen, the leading edge of card 10 of the Chao design extends between the read/write heads 24 and 26 when fully inserted with filter cap 12 in the mouth of the floppy disk drive. As can be seen, there is no stop as to how far the filter-seal 10 of Chao can be inserted into the floppy disk drive.

Figure 3:
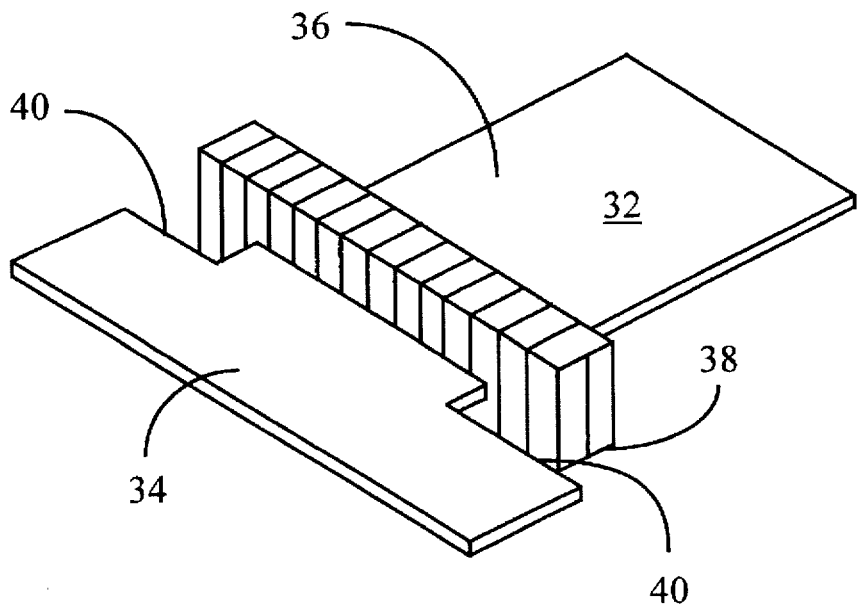
FIG. 3 is a front end perspective view of a first embodiment of the present invention in the form of a T-shape floppy drive seal insert.

FIG. 3 is a front perspective view of the first embodiment of a floppy drive seal of the present invention. The insert includes a T-shaped card stock body portion 32 with a sealing sleeve 38 surrounding body portion 36 with the top T-bar section 34 on one side of sealing sleeve 38 (made of an elastic solid or porous material) and the portion 36 of body 32 that is to be inserted into the floppy disk drive on the other side. Since the insertable body portion 36 is narrower than the mouth of the floppy disk drive to permit that insertion, and sealing sleeve 38 is sized to fill the mouth of the floppy disk drive when inserted, the inside edge of outer ends 40 of the T-bar 34 come into contact with the front surface of the floppy disk drive when sealing sleeve 38 is inserted to prevent body portion 32 from extending too far into the floppy disk drive which is illustrated below in FIG. 10. Thus, the combination of the combined thicknesses of body portion 36 and the surrounding sealing sleeve 38 is at least as thick as the maximum height of the mouth of the disk drive from top to bottom, and as wide as the mouth of the disk drive from side to side.

The sealing sleeve 38 is mounted on body portion 36 adjacent T-bar 34. The total thickness of sealing sleeve 38, together with the thickness of body portion 36, should be slightly thicker and wider than the height and width of the mouth of the disk drive. The type of material that is selected determines whether sealing sleeve 38 seals the mouth of the disk drive from any air flow or whether it acts as a dust seal while still permitting air to flow into and out of the disk drive. If the function is to seal the mouth of the disk drive to air flow, then the material for sealing sleeve 38 will be a non-porus membrane (e.g., rubber, silicon rubber, or an elastic polymer). Whereas, if sealing sleeve 38 is to act as a dust seal the selected material can be selected from those that are elastic and porus, with the pours being small enough to capture the smallest dust particle desired (e.g., resin treated polyester fiber, paper, open cell foam), and potentially also treated with a dust attracting agent to improve the capture of dust of a small size. Thus, in either configuration, the elasticity and slightly oversized sizing of sealing sleeve 38 gives it the ability to compress and fill the mouth of the disk drive from top to bottom and side to side when inserted therein. The stress due to the inherent elasticity of the material of sealing sleeve 38 continuously urges sealing sleeve 38 to fill the mouth of the disk drive.

Figure 4:
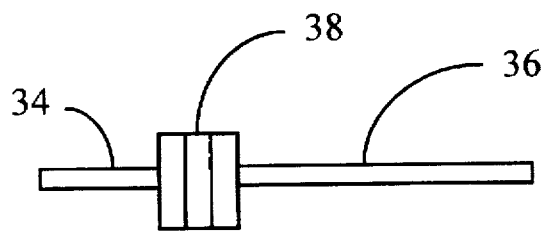
FIG. 4 is a side view of a floppy drive seal insert of the first embodiment of FIG. 3.
Figure 5:
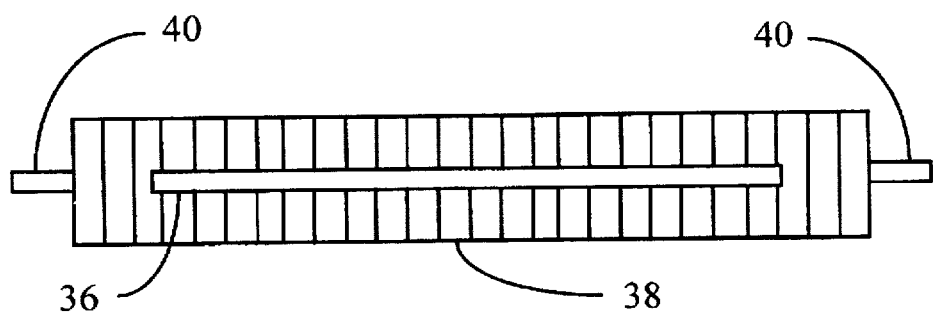
FIG. 5 is an back end view of a seal for all of the embodiments of the present invention surrounding the body of the insert at the end that is not to be inserted into the floppy disk drive.
Figure 6:
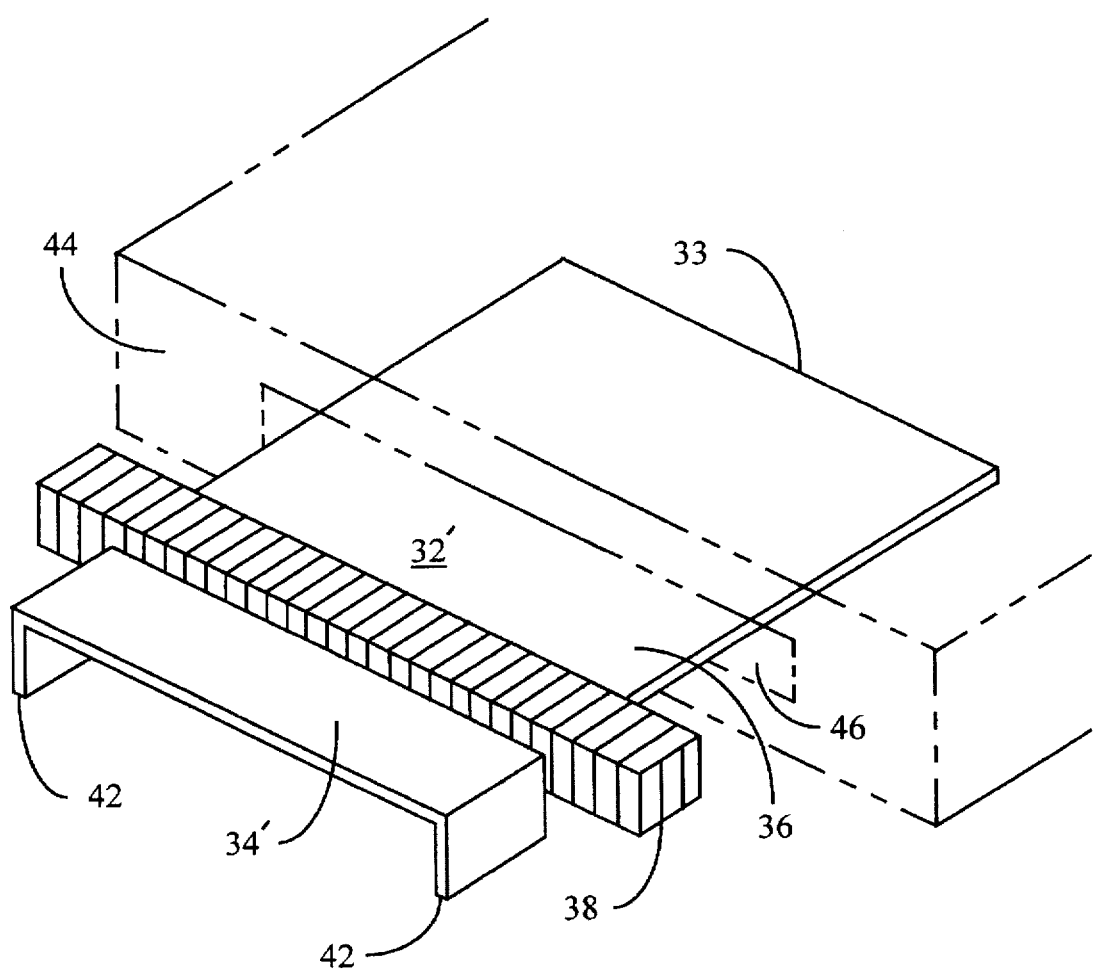
FIG. 6 is a front end perspective view of a second embodiment of a rectangular floppy drive seal insert of the present invention partially inserted into a floppy disk drive.

FIGS. 4 and 5 each show an additional view of the device of FIG. 3, with a side view shown in FIG. 4 and a back end view shown in FIG. 5. In FIG. 5, ends 40 of the T-bar section 34 (not shown) can been seen to extend beyond the ends of sealing sleeve 38 that encircles body portion 36.

Figure 7:
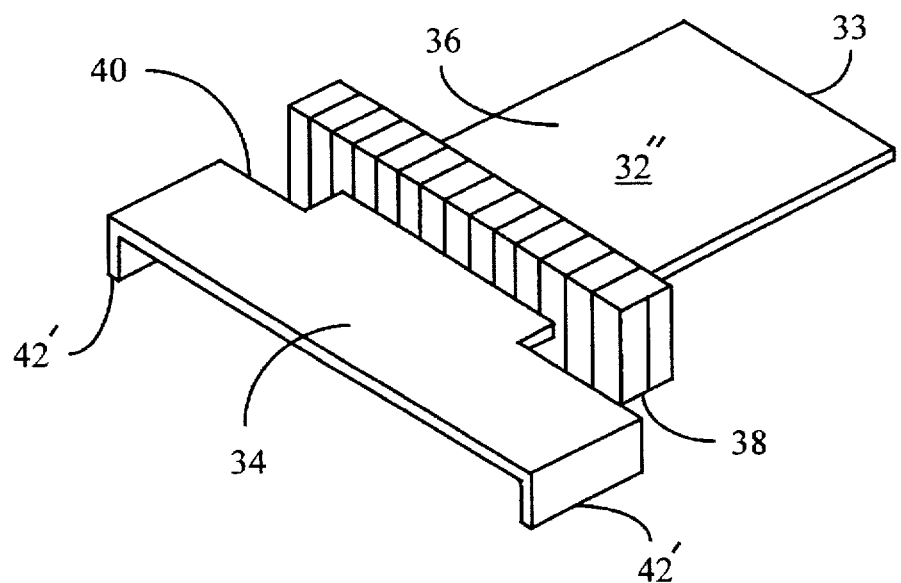
FIG. 7 is a front end perspective view of the third embodiment of the present invention of FIG. 6.
Figure 8:
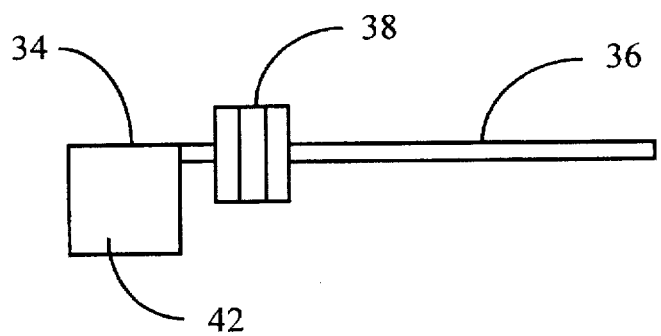
FIG. 8 is a side view of the second embodiment of the present invention of FIG. 6.
Figure 9:
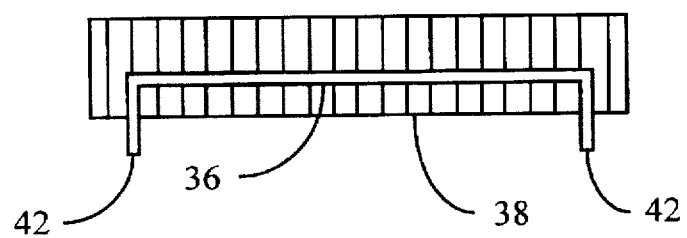
FIG. 9 is a front end view of the second embodiment of the present invention of FIG. 6.

FIGS. 6 and 8 through 10 illustrate a second embodiment of the present invention, and FIG. 7 illustrates a third embodiment of the present invention.

The second embodiment is similar to the first embodiment with the only difference being that the ends 40 of the T-bar portion 34 of the first embodiment have been folded downward to form tabs 42. In this embodiment body portion 34' is as wide as body portion 36 with the inside edges of tabs 42 now providing the stops to prevent the over-insertion of card 32' into the floppy disk drive. Otherwise the second embodiment is the same as the first embodiment.

The third embodiment of FIG. 7 in turn is a combination of the first and second embodiments. In this embodiment the downward turned tabs 42' are formed on the ends 40 of the T-bar 34 to form a three dimensional stop on both sides of the T-bar 34, namely the edges of ends 40 and downturned tabs 42'. These two features together define a three dimensional surface on both sides of body portion 32" that come into contact with the front surface of the floppy disk drive when body portion 32" is inserted into a floppy disk drive to prevent the over-insertion of body portion 32" into the floppy disk drive.

Figure 10:
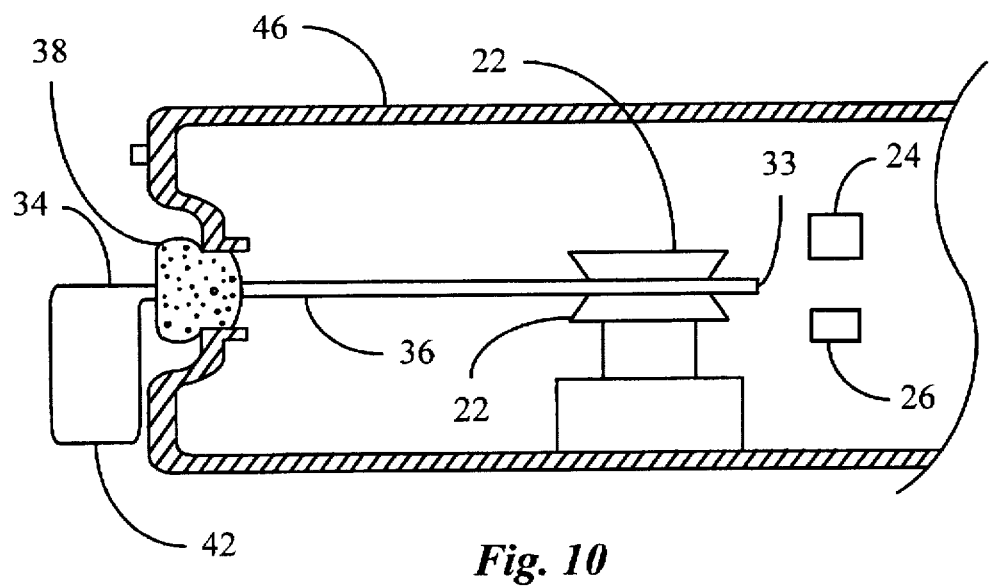
FIG. 10 is a side view of the second embodiment of the present invention shown fully inserted into a floppy disk drive that is shown in a simplified partial cut-way side view of a floppy disk drive.

FIG. 10 illustrates the extent of the insertion of the body portion 32 of all three of the embodiments of the present invention (second embodiment is illustrated, however the inclusions of stops in all three embodiments provides the same result). Here it can be seen that leading edge 33 of body portion 32' does not reach read/write heads 24 and 26, thus preventing potential damage to the heads by abrasion. Also shown in FIG. 10 is sealing sleeve 38 filling the mouth of the floppy disk drive and the inside edge of tabs 42 coming up against the front of the floppy disk drive.

Figure 12:
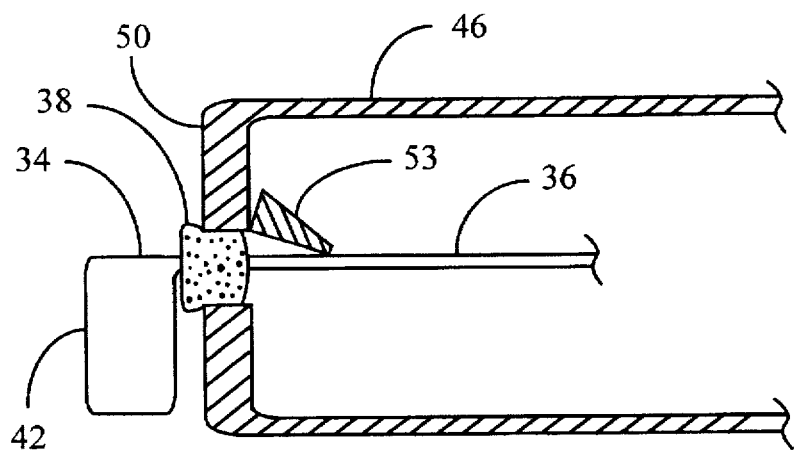
FIG. 12 is a partial cut-away side view of a floppy disk drive having an internal spring loaded door to close the mouth thereof when no disk is inserted thereinto having the second embodiment of the present invention inserted through the mouth of the floppy disk drive illustrating the sealing of the mouth with the seal element and the body of the present invention holding the door open in the same manner that an inserted disk would do so.

Similarly, in FIG. 12, body portion 36 is shown extending into a 3.5 inch floppy disk drive with body portion 36 holding hinged door 53 open with sealing sleeve 38 filling the mouth of the floppy disk drive.

Figure 11:
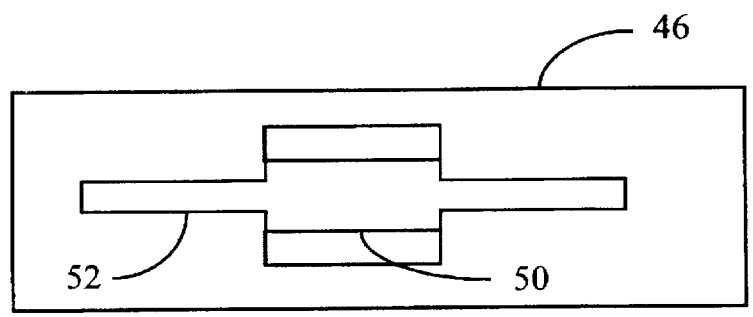
FIG. 11 is a front view of a typical floppy disk drive having a mouth thereof that is not of a uniform height.

FIG. 11 has also be included to illustrate the non-uniform width of the mouth of some floppy disk drives which it is necessary for sealing sleeve 38 to fill if the air seal is to be effective.

Operation

The manner of using a floppy drive seal insert of the present invention is similar to the insertion of a floppy disk in a floppy disk drive. An empty floppy disk drive that is not in operation is selected and the body portion 36 of a floppy drive seal of the present invention that is sized to fit that floppy disk drive is inserted in the mouth of the floppy disk drive. Taking hold of exposed body portion 34, the leading edge 33 is advanced within the floppy disk drive until the inside edge of one or both of stops 40 and 42 (if so equipped) come into contact with the face of the floppy disk drive thus seating sealing sleeve 38 into the mouth of the floppy disk drive since the spacing between sealing sleeve 38 and stops 40 and 42 has been determined to provide that positive function without over inserting body portion 32 into the floppy disk drive. At such time insertion of the floppy drive seal insert is complete. To remove the floppy drive seal insert of the present invention when the floppy disk drive is to be used, one grasps the body portion 34 that extends out from the face of the floppy disk drive and pulls gently, thus completely removing sealing sleeve 38 from the mouth of the floppy disk drive and fully extracting of body portion 36 from within the floppy disk drive.

Therefore there are some important advantages to the use of a floppy drive seal insert of the present invention that are summarized as follows:

a. to provide a limited filtered and/or sealed environment for a floppy disk drive while not in use;

b. to provide a device that is inserted similarly to a floppy disk;

c. to provide a device that does not require the modification to existing hardware;

d. to provide a device that does not interfere with internal hardware mechanisms; and e. to provide a device that automatically seats the seal into the mouth of the floppy disk drive.

Furthermore, the present invention, because of its simplicity and ease of use, is more likely to be used and over time when left in place there will be less accumulation of destructive airborne contaminants on the internal parts of the floppy disk drive. The result is less potential for error or failure of floppy disk drive operation, requiring fewer repairs or replacement of floppy disk drive hardware.

The application of a floppy drive seal insert of the present invention is not limited to floppy disk drives. Other style players that use a removable media with external ports can benefit from use of a floppy drive seal insert of the same or a similar design.

Conclusion and Ramifications

Accordingly, the reader will see that use of a floppy drive seal insert provides an ample barrier to airborne contaminants that foul the internal workings of a floppy disk drive. A floppy drive seal insert is convenient to use assuring continued use of the floppy disk drive. The generally static condition of floppy disk drives provides no prior warning as to disruptive contaminant build up. Preventing this build up can help assure the user that the floppy disk drive is ready for use. Keeping a floppy disk drive clean will result in less maintenance, repair or replacement cost.

While the present invention has been described in several different embodiments, it is contemplated that persons skilled in the art, upon reading the preceding descriptions and studying the drawings, will realize various alternative approaches to the implementation of the present invention. It is therefore intended that the following appended claims be interpreted as including all such alterations and modifications that fall within the true spirit and scope to the present invention and the appended claims.

What is claimed is:

1. An insertable sealing device for insertion into a disk drive when not in operation through a slot in said disk drive through which removable media is inserted and removed from said disk drive, said sealing device when in place in said slot impedes entrance of airborne contaminants into said disk drive through said slot, said sealing device comprising:

a T-shaped body of a rigid sheet material shaped to mate with a selected disk drive design, said T-shaped body portion defining two regions thereof:

a first region that is narrower and thinner than the width and height, respectively, of the slot of said disk drive and that is disposed to be inserted into said disk drive through said slot, said first region being the stem of the T and being shorter than the distance from said slot to the rear of said disk drive; and a second region that is wider than the width of said slot of said disk drive and that is not disposed to be accepted by said disk drive, said second region being the cross-bar of the T-shape with the edge thereof extending away from the intersection of said first and second regions forming a stop surface to limit the distance that said first region can be inserted through said slot into said disk drive; and a sealing sleeve surrounding said first region of said body and spaced apart a selected distance from said stop surface of said second region to position said sealing sleeve in said slot of said disk drive to seal said slot when said stop surface contacts said disk drive, said sealing sleeve being elastic and in ample quantity to fill said slot of said disk drive.

2. An insertable sealing device as in claim 1 wherein the portions of the second region that extend beyond the width of said first region are folded downward to form tabs with the edge of said tabs extending away from the intersection of said first and second regions forming a stop surface to limit the distance that said first region can be inserted into said slot of said disk drive.

3. An insertable sealing device as in claim 1 wherein a selected length of the portions of the cross-bar of the second region that extend beyond the width of said first region are folded downward to form tabs with the edge of said tabs together with the remaining portion of said cross-bar that extend away from the intersection of said first and second regions forming a three dimension stop surface to limit the distance that said first region can be inserted into said slot of said disk drive.

4. An insertable sealing device as in claim 1 wherein said first region is shorter than the length of a disk to be accepted by said disk drive to prevent the extension of said first region to delicate parts within said disk drive when said sealing device is inserted into said disk drive.

5. An insertable sealing device as in claim 1 wherein said sealing sleeve is non-porous to prevent air flow into and out of said disk drive through said slot.

6. An insertable sealing device as in claim 1 wherein said sealing sleeve is porous to capture and prevent entry of airborne particles into said disk drive through said slot.

* * * * *